United States Patent
Bui et al.

(10) Patent No.: US 6,791,781 B2
(45) Date of Patent: Sep. 14, 2004

(54) METHOD AND APPARATUS FOR PROVIDING LINEAR POSITION (LPOS) ESTIMATIONS

(75) Inventors: Nhan X. Bui, Tucson, AZ (US); John Alexander Koski, Tucson, AZ (US); Akimitsu Sasaki, Yokohama (JP); Keisuke Tanaka, Kawasaki (JP); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 09/907,307

(22) Filed: Jul. 17, 2001

(65) Prior Publication Data

US 2003/0016465 A1 Jan. 23, 2003

(51) Int. Cl.[7] .................. G11B 15/18; G11B 15/46; G11B 5/09
(52) U.S. Cl. .................. 360/72.2; 360/72.3; 360/72.09; 360/51
(58) Field of Search ................ 360/72.1, 72.2, 360/72.3, 74.1, 75, 31, 53, 73.04, 73.09, 51

(56) References Cited

U.S. PATENT DOCUMENTS

| | | | |
|---|---|---|---|
| 4,151,566 A | 4/1979 | Ohrman | 360/72.1 |
| 4,217,615 A | 8/1980 | Suzuki | 360/137 |
| 4,363,042 A | 12/1982 | Kimura et al. | 360/71 |
| 4,427,166 A | 1/1984 | Oishi et al. | 242/199 |
| 4,466,582 A | 8/1984 | Shiba | 242/197 |
| 4,494,711 A | 1/1985 | Van Pelt | 242/184 |
| 4,996,611 A | 2/1991 | Ito | 360/72.3 |
| 5,016,123 A | 5/1991 | Karsh | 360/69 |
| 5,032,937 A | 7/1991 | Suzuki et al. | 360/73.06 |
| 5,323,286 A | 6/1994 | Faul | 360/137 |
| 5,447,279 A | 9/1995 | Janssen et al. | 242/358 |
| 5,450,257 A | 9/1995 | Tran et al. | 360/76 |
| 5,532,583 A | 7/1996 | Davis et al. | 324/202 |
| 5,572,393 A | 11/1996 | Church et al. | 360/130.21 |
| 5,675,448 A | 10/1997 | Molstad et al. | 360/77.12 |
| 5,793,573 A | 8/1998 | Eckberg et al. | 360/106 |
| 5,875,066 A | 2/1999 | Ottesen | 360/77.11 |
| 5,995,317 A | 11/1999 | Ottesen | 360/77.04 |
| 6,018,434 A | 1/2000 | Saliba | 360/77.13 |
| 6,049,441 A | 4/2000 | Ottesen | 360/77.04 |
| 6,082,653 A | 7/2000 | Abedor et al. | 242/357 |
| 6,118,630 A | 9/2000 | Argumedo | 360/130.21 |
| 6,622,113 B2 * | 9/2003 | Koski et al. | 702/151 |
| 2002/0198678 A1 * | 12/2002 | Koski et al. | 702/164 |

OTHER PUBLICATIONS

"Position Calibration Tool for Magnetic Moving Tape Drive Heads," IBM, Technical Disclosure Bulletin, vol. 37, No. 09, Sep. 1994, pp. 501–506.

"Capacitive Tape Loop Position Detector," IBM, Technical Disclosure Bulletin, vol. 14, No. 06, Nov. 1971, pp. 1830–1831.

Patent Abract of Japan (JP 58189877), Recording System of Recorder, Hiroyoki et al, Nov. 5, 1983.

* cited by examiner

Primary Examiner—Andrew L. Sniezek
(74) Attorney, Agent, or Firm—Crawford Maunu PLLC

(57) ABSTRACT

A method and apparatus for providing linear position (LPOS) estimations. If valid LPOS data may be detected from the tape, then a first method for LPOS estimation is performed using the Hall effect sensors. If valid LPOS data may not be detected from the tape, then an error recovery procedure (ERP) is invoked so that a second method for LPOS estimation is used to provide accurate LPOS information which is synchronized to a validly detected LPOS from tape within about 1 meter prior to the desired data record.

22 Claims, 13 Drawing Sheets

METHOD AND APPARATUS FOR PROVIDING LINEAR POSITION (LPOS) ESTIMATIONS

BACKGROUND OF THE INVENTION

1. Field of the Invention.

This invention relates in general to data storage systems, and more particularly to a method and apparatus for providing linear position (LPOS) estimations.

2. Description of Related Art.

Data loss is a serious threat to companies of all sizes, and catastrophic data loss can destroy a business. But most data loss isn't the result of a big disaster, it's caused by human error, viruses, and disk malfunctions. A suitable backup routine provides the best protection against data loss of all kinds. And tape technology remains the most efficient and cost-effective means to perform system backup, whether for a small business or a global 24×7 operation.

Tape remains unrivaled in terms of cost and capacity for data storage, and should play an increasing crucial role in corporate data protection strategies. No other technology offers the same combined low cost and high capacity advantage of tape. While other technologies may offer strengths in one or more areas, overall, they do not meet the entire set of customer needs that tape addresses.

Tape drives make backup fast, easy, reliable and affordable. Speed is critical because your data is constantly growing while the time available for backup is shrinking. Even the slowest tape drive writes 1 MB per second and the fastest 30 MB per second, which means a 200 GB backup can be completed in less than two hours. Furthermore, unlike other storage methods, tape drives offer a range of media that allows you to back up all the data on a small to medium-sized server. Tape backup also captures system setup information, as well as data, allowing an entire system to be restored in the event a disaster strikes. Also, backups can be scheduled to occur automatically at a time determined to be most convenient.

Another area where tape storage excels is when it comes to data protection. Tape has proved itself a reliable medium, and tape drives themselves have never been more reliable. Easily portable, tapes have the added advantage of being simple to remove and store offsite, so keeping a disaster recovery copy is less of a burden.

In terms of affordability, tape is the most cost-effective way to store large amounts of data per gigabyte of storage. The compact size of tape cartridges also helps keep down your storage costs.

Nevertheless, the tape industry has become fragmented the proliferation of formats and technologies has overly complicated customer buying decisions. Therefore, LTO Technology (or Linear Tape-Open Technology) has been developed to combine the advantages of linear multi-channel bi-directional tape formats in common usage today with enhancements in the areas of timing-based servo, hardware data compression, optimized track layouts and high efficiency error correction code to maximize capacity and performance.

The new LTO tape product uses a tape format that has longitudinally pre-written servo tracks. The servo tracks provide a timing-based track-following position error system. The tracks contain a repeated pattern of recorded flux transitions that occur as grouped bursts of 5, 5, 4, and 4 transitions. The timing between the sets of 5-bursts and between sets of 4-bursts provides the position information for the track following system. Additionally, the individual transitions within the 5-bursts are phase-shifted in a manner that encodes longitudinal position information (LPOS) into the servo tracks. By detecting the phase-encoded LPOS information, the tape transport system determines the tape position relative to landmarks lengthwise down the tape. The LPOS information is used to keep track of the longitudinal position of data records written onto or read from the tape, and is used to locate those data records when the reading or writing process temporarily stops. The LPOS location of data files on tape is also stored in the volume control data for use to locate the data files during a later tape cartridge load for reading, or for write-appending new files onto the end of the last file written to the tape. The LPOS data is thus used as the primary positional information for the tape transport servo control system, it is used in the decision process for starting and stopping the tape, and for backhitching the tape in order to position the read-write heads at the beginning of a data record at the required velocity and track position which allows the start of a new data transfer operation.

Ideally the LPOS information from the servo track would be available all the time. In fact, it is only available when the servo read heads are positioned over the servo tracks, and tape speed is sufficient to produce read signal with servo read bias on, and the servo track is free of defects. When the LPOS from tape is unavailable, it must be estimated from other sources. The conditions when LPOS is not available from the servo track includes acceleration and deceleration of tape to velocity, indexing the servo read heads between servo bands, initial acquisition of the servo track during cartridge load and initialization, lateral recovery of the track following system to the servo tracks on tape, and defects in the servo read signal timings that make LPOS undetectable. All of these cases are common conditions in the normal operation of an LTO tape drive and require a regular and reliable method to estimate the LPOS data.

Accordingly, it can be seen that there is a need for a method and apparatus for estimating LPOS which always provides LPOS data, has sufficient accuracy to move tape over the whole tape length, and allows rewind and unload of the media.

However, during the read process, the tape transport system must synchronize the data channel to the media position to start the read data flow. For the first record to be read after the tape has been stopped, the tape transport system requires accurate LPOS information read from the tape in order to synchronize the read process to beginning of the data record on tape. This is normally done by requiring that valid LPOS data be read from tape. However, in very rare cases, there may be a defect in the servo read signal that makes LPOS invalid at this point. The result of this can be a permanent read error unless a second method of estimating LPOS very accurately is devised.

Therefore, there is a need for a method for, not only estimating LPOS which always provides LPOS data, has sufficient accuracy to move tape over the whole tape length, and allows rewind and unload of the media, but also for estimating LPOS so as to overcome a permanent read error which may occur due to mis-detected LPOS at the beginning of the first data record to be read after a tape stopped condition, repositioning condition, or a band change.

SUMMARY OF THE INVENTION

To overcome the limitations in the prior art described above, and to overcome other limitations that will become apparent upon reading and understanding the present specification, the present invention discloses a method and apparatus for providing linear position (LPOS) estimations.

The present invention solves the above-described problems by selecting a method for estimating LPOS based upon whether a read error prevents detection of valid LPOS values.

A method in accordance with the principles of the present invention includes a) determining whether detection of accurate and valid linear position data from a magnetic recording tape is needed, b) performing linear position estimation using the Hall effect sensors when linear position data from a magnetic recording tape is not needed and c) invoking an error recovery procedure to provide accurate and valid linear position information from tape when linear position data from a magnetic recording tape is needed.

Other embodiments of a method in accordance with the principles of the invention may include alternative or optional additional aspects. One such aspect of the present invention is that the accurate linear position information is synchronized to a validly detected linear position data from tape.

Another aspect of the present invention is that the accurate linear position information which is synchronized to a validly detected linear position data from tape within about one meter prior to the desired data record.

Another aspect of the present invention is that performing linear position estimation using the Hall effect sensors further includes i) scanning a media position trace in a media position trace table beginning with the most recently detected linear position, ii) subtracting a previous stored linear position from a most recent linear position, iii) determining whether the difference between the previous stored linear position and the most recent linear position is equal to 1, iv) using the most recent table entry to initialize the estimator when the difference is equal to 1, v) determining whether all eight entries of the media position trace table are exhausted when the difference is not equal to 1, vi) incrementing to a next most recent linear position when all eight entries are not exhausted and repeating ii–iii, vii) repeating ii-vi until a difference between successive linear position entries of 1 are found or all eight entries are exhausted, viii) using the value for linear position and Hall counter at LP2 when all eight entries are exhausted without finding a valid entry with which to initialize the linear position estimator, ix) loading value of inboard reel radius at LP2 and x) setting an estimate flag is set TRUE to enable the estimate computations and to replace the detected linear position from tape with the estimated linear position when the detected linear position from tape is invalid and the estimator is initialized.

Another aspect of the present invention is that an algorithm to estimate linear position from the Hall counter is given by the equations: linear position.estimate is the linear position$(0)+(pi/N_{hall})*[Rad+Rad(0)]*[HallCount-HallCount(0)]$, where, linear position.estimate is the estimated linear position, linear position(0) is the initial condition for linear position, Rad is the radius of the inboard reel, Rad(0) represents the initial condition for inboard reel radius, HallCount represents the inboard motor hall counter value, HallCount(0) represents the initial condition for the inboard hall counter, pi is a physical constant, and $N_{hall}$ represents the resolution of the hall sensors.

Another aspect of the present invention is that invoking an error recovery procedure further includes reading linear position from tape when a tape transport system has locked onto a servo track prior to a data record to be read and when the velocity is controlled to a predetermined velocity, begin estimating linear position by measuring time intervals since the last valid linear position detected when valid linear position is lost prior to reaching the target data record, counting the servo interrupt timings, accumulating to a value equal to the number of interrupts between nominal linear position detection points, resetting the accumulator to zero when this value has been reached, incrementing the linear position estimate if tape motion is forward, and decrementing the linear position estimate if tape motion is backward, determining whether the estimated target linear position is reached, and the data flow synchronized and when the estimated target linear position is not reached, or the data flow is not synchronized, counting the servo interrupt timings again until the estimated target linear position is reached or the data flow is synchronized.

Another aspect of the present invention is that the predetermined velocity error is less than 0.5 percent of the nominal value of 4 meters/second.

In another embodiment of the present invention, a tape drive is provided. The tape drive includes magnetic recording tape having servo signals and data recording thereon, tape takeup and supply reels for spooling the magnetic recording tape thereon, a head for reading signals on the magnetic tape, reel motors, coupled to the tape takeup and supply reels, for driving the tape takeup and supply reels to move the tape relative to the head, Hall effect sensors, coupled to the reel motors, for sensing revolution of the tape takeup and supply reels, the Hall effect sensors providing a Hall count resolution for linear tape position that varies with tape reel radius, a controller for driving the reel motors and an estimator, coupled to the Hall effect sensors, for using the Hall count to produce linear tape position information, wherein the estimator scans a media position trace in a media position trace table beginning with the most recently written linear position, subtracts a previous stored linear position from a most recent linear position, determines whether the difference between the previous stored linear position and the most recent linear position is equal to 1, uses the most recent table entry to initialize the estimator when the difference is equal to 1, ascertains whether all eight entries of the media position trace table are exhausted when the difference is not equal to 1, increments to a next most recent linear position when all eight entries are not exhausted and repeating the subtracting and determining, repeating the subtracting, determining, using and ascertaining until a difference between successive linear position entries of 1 are found or all eight entries are exhausted, uses the value for linear position and Hall counter at LP2 when all eight entries are exhausted without finding a valid entry with which to initialize the linear position estimator, loads a value of inboard reel radius at LP2 and sets an estimate flag is set TRUE to enable the estimate computations and to replace the detected linear position from tape with the estimated linear position when the detected linear position from tape is invalid and the estimator is initialized.

In another embodiment of the present invention, a tape drive is provided. The tape drive includes magnetic recording tape having servo signals and data recording thereon, tape takeup reels for spooling the magnetic recording tape thereon, a head for reading signals on the magnetic tape, reel motors, coupled to the tape takeup reels, for driving the tape takeup reels to move the tape relative to the head, Hall effect sensors, coupled to the reel motors, for sensing revolution of the tape takeup reels, the Hall effect sensors providing a Hall count resolution that varies with tape reel radius, a controller for driving the reel motors and processing signals from the head, and an estimator, coupled to the Hall effect sensors, for using the Hall count resolution to produce linear position information, wherein the estimator reads linear position from the tape when a tape transport system has locked onto a servo track prior to a data record to be read and when the velocity is controlled to a predetermined velocity, begins estimating linear position by measuring time intervals since the last valid linear position detected when valid linear position is lost prior to reaching the target data record, counts the servo interrupt timings, accumulates to a value equal to the number of interrupts between nominal linear position detection points, resets the accumulator to zero when this value has been reached, increments the linear position estimate if tape motion is forward, and decrementing the linear position ed if tape motion is backward, determines whether the estimated target linear position is reached, and the data flow synchronized and when the estimated target linear position is not reached, or the data flow is not synchronized, counting the servo interrupt timings again until the estimated target linear position is reached or the data flow is synchronized.

In another embodiment of the present invention, an article of manufacture comprising a program storage medium readable by a computer is provided. The medium tangibly embodies one or more programs of instructions executable by the computer to perform a method for providing linear position (LPOS) estimations, wherein the method includes a) determining whether detection of accurate and valid linear position data from a magnetic recording tape is needed, b) performing linear position estimation using the Hall effect sensors when linear position data from a magnetic recording tape is not needed and c) invoking an error recovery procedure to provide accurate and valid linear position information from tape when linear position data from a magnetic recording tape is needed.

Another aspect of the article of manufacture of the present invention is that the accurate linear position information is synchronized to a validly detected linear position from tape.

Another aspect of the article of manufacture of the present invention is that the accurate linear position information which is synchronized to a validly detected linear position from tape within about one meter prior to the desired data record.

Another aspect of the article of manufacture of the present invention is that performing linear position estimation using the Hall effect sensors further includes i) scanning a media position trace in a media position trace table beginning with the most recently written linear position, ii) subtracting a previous stored linear position from a most recent linear position, iii) determining whether the difference between the previous stored linear position and the most recent linear position is equal to 1, iv) using the most recent table entry to initialize the estimator when the difference is equal to 1, v) determining whether all eight entries of the media position trace table are exhausted when the difference is not equal to 1, vi) incrementing to a next most recent linear position when all eight entries are not exhausted and repeating ii–iii, vii) repeating ii–vi until a difference between successive linear position entries of 1 are found or all eight entries are exhausted, viii) using the value for linear position and Hall counter at LP2 when all eight entries are exhausted without finding a valid entry with which to initialize the linear position estimator, ix) loading value of inboard reel radius at LP2 and x) setting an estimate flag is set TRUE to enable the estimate computations and to replace the detected linear position from tape with the estimated linear position when the detected linear position from tape is invalid and the estimator is initialized.

Another aspect of the present invention is that an algorithm to estimate linear position from the Hall counter is given by the equations: linear position.estimate is the linear position$(0)+(pi/N_{hall})*[Rad+Rad(0)]*[HallCount-HallCount(0)]$, where, linear position.estimate is the estimated linear position, linear position(0) is the initial condition for linear position, Rad is the radius of the inboard reel, Rad(0) represents the initial condition for inboard reel radius, HallCount represents the inboard motor hall counter value, HallCount(0) represents the initial condition for the inboard hall counter, pi is a physical constant, and $N_{hall}$ represents the resolution of the hall sensors.

Another aspect of the article of manufacture of the present invention is that invoking an error recovery procedure further includes reading linear position from tape when a tape transport system has locked onto a servo track prior to a data record to be read and when the velocity is controlled to a predetermined velocity, begin estimating linear position by measuring time intervals since the last valid linear position detected when valid linear position is lost prior to reaching the target data record, counting the servo interrupt timings, accumulating to a value equal to the number of interrupts between nominal linear position detection points, resetting the accumulator to zero when this value has been reached, incrementing the linear position estimate if tape motion is forward, and decrementing the linear position ed if tape motion is backward, determining whether the estimated target linear position is reached, and the data flow synchronized and when the estimated target linear position is not reached, or the data flow is not synchronized, counting the servo interrupt timings again until the estimated target linear position is reached or the data flow is synchronized.

Another aspect of the article of manufacture of the present invention is that the predetermined velocity error is less than 0.5 percent of the nominal value of 4 meters/second.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing linear position (LPOS) estimations. If valid LPOS data may not be detected from the tape, then a first method for LPOS estimation is performed using the Hall effect sensors. If valid LPOS data may be detected from the tape but is lost prior to the first data record to be read, then an error recovery procedure (ERP) is invoked so that a second method for LPOS estimation is used to provide accurate LPOS information which is synchronized to a validly detected LPOS from tape within about 1 meter prior to the desired data record to be read.

Figure 1:
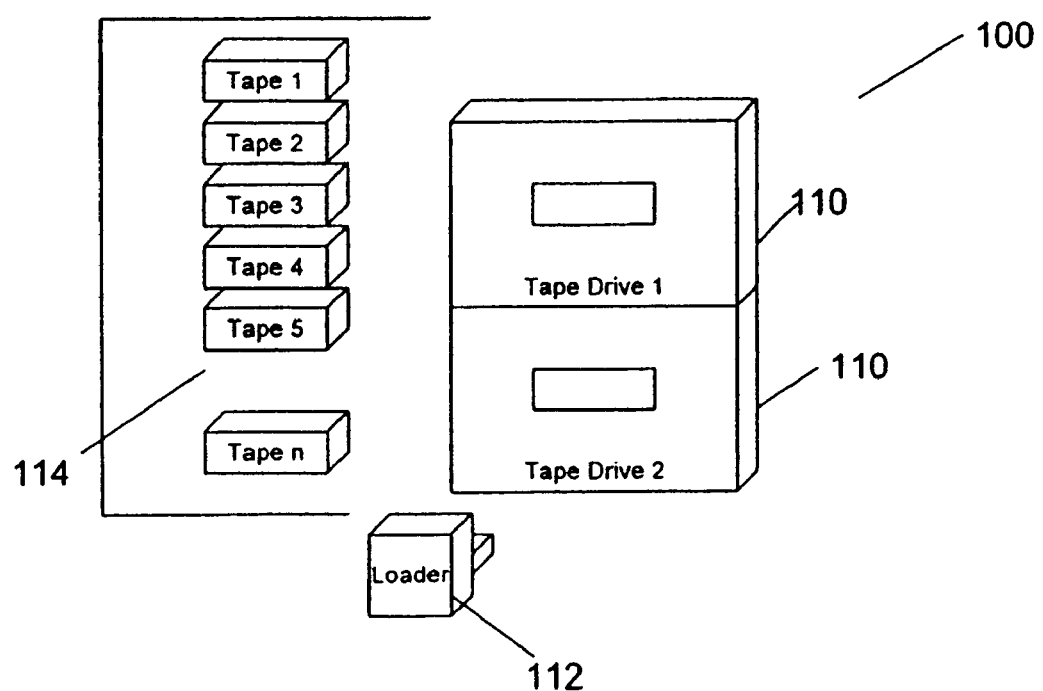
FIG. 1 illustrates a tape library system according to the present invention.

FIG. 1 illustrates a tape library system 100. The tape library system 100 includes at least one tape drive 110, a loader 112, and a library of tape cassettes or cartridges 114 that can be accessed by the loader 112 so as to load the tape drive 110 with an appropriately identified tape cassette or cartridge.

Figure 2:
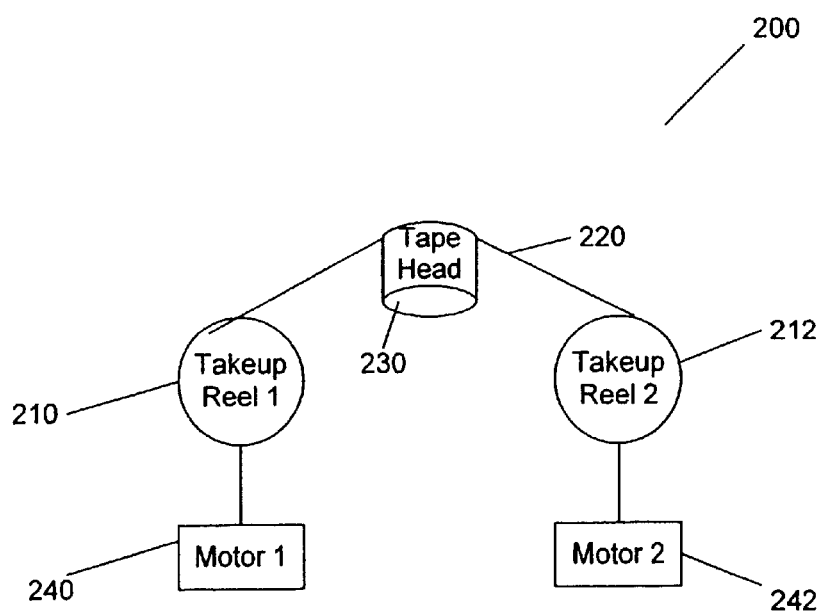
FIG. 2 illustrates a tape system according to the present invention.

FIG. 2 illustrates a tape system 200. The tape system 200 includes a first and second takeup reel 210, 212. Magnetic recording tape 220 is spooled on the first and second takeup reels 210, 212. The magnetic recording tape 220 is routed over a tape read/write head 230 for reading and writing data on the magnetic recording tape 220. Takeup reel motors 240, 242 control the positioning of the magnetic recording tape 220 over the tape read/write head 230.

Figure 3:
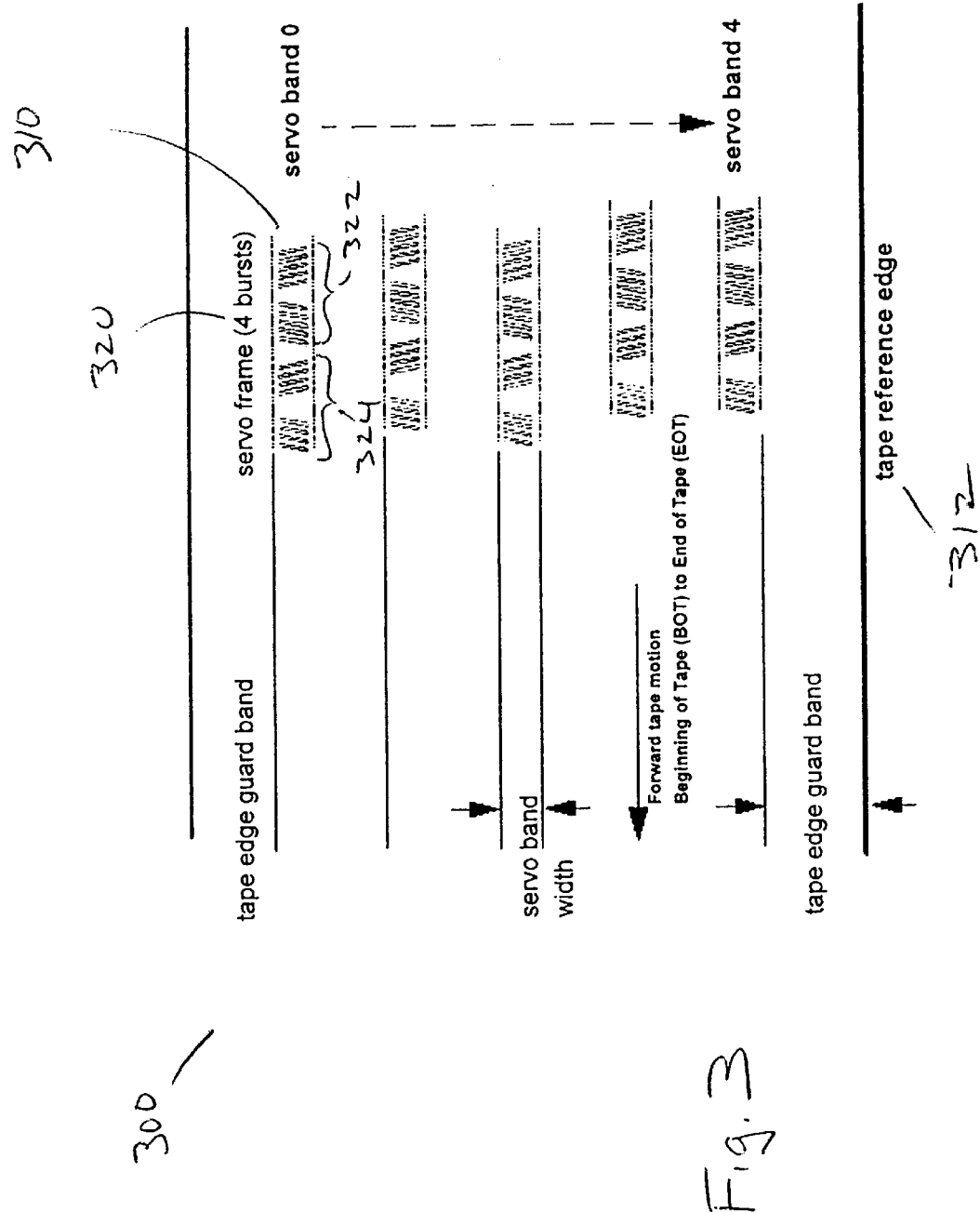
FIG. 3 illustrates the recording format according to the present invention.

According to the present invention, a tape drive uses an interleaved, serpentine, longitudinal recording format. FIG. 3 illustrates the recording format 300 according to the present invention. The first set of eight data tracks is written from near the physical beginning of the tape to near the physical end of the tape. The head then repositions to the next set of tracks for the return. This process continues until all tracks are written and the tape is full.

Servo tracks (also called bands) 310 enable accurate positioning of the tape drive head over the data track, ensuring that the head does not stray onto an adjacent track. They are necessary to support high data densities on the tape where the tracks are very close together. The servo bands 310 are written at time of manufacture of the cartridge, prior to the cartridge being usable for data storage and retrieval.

There are five servo bands, numbered 0 through 4, which make up the servo tracking mechanism on the tape. They are each located at specific distances from the tape reference edge 312. Within the servo bands are servo stripes, groups of which make up servo bursts. Four servo bursts 320 make up a servo frame; the first two bursts 322 (as written in the forward tape motion direction) contain five flux transitions and the second two bursts 324 contain four flux transitions.

Figure 4:
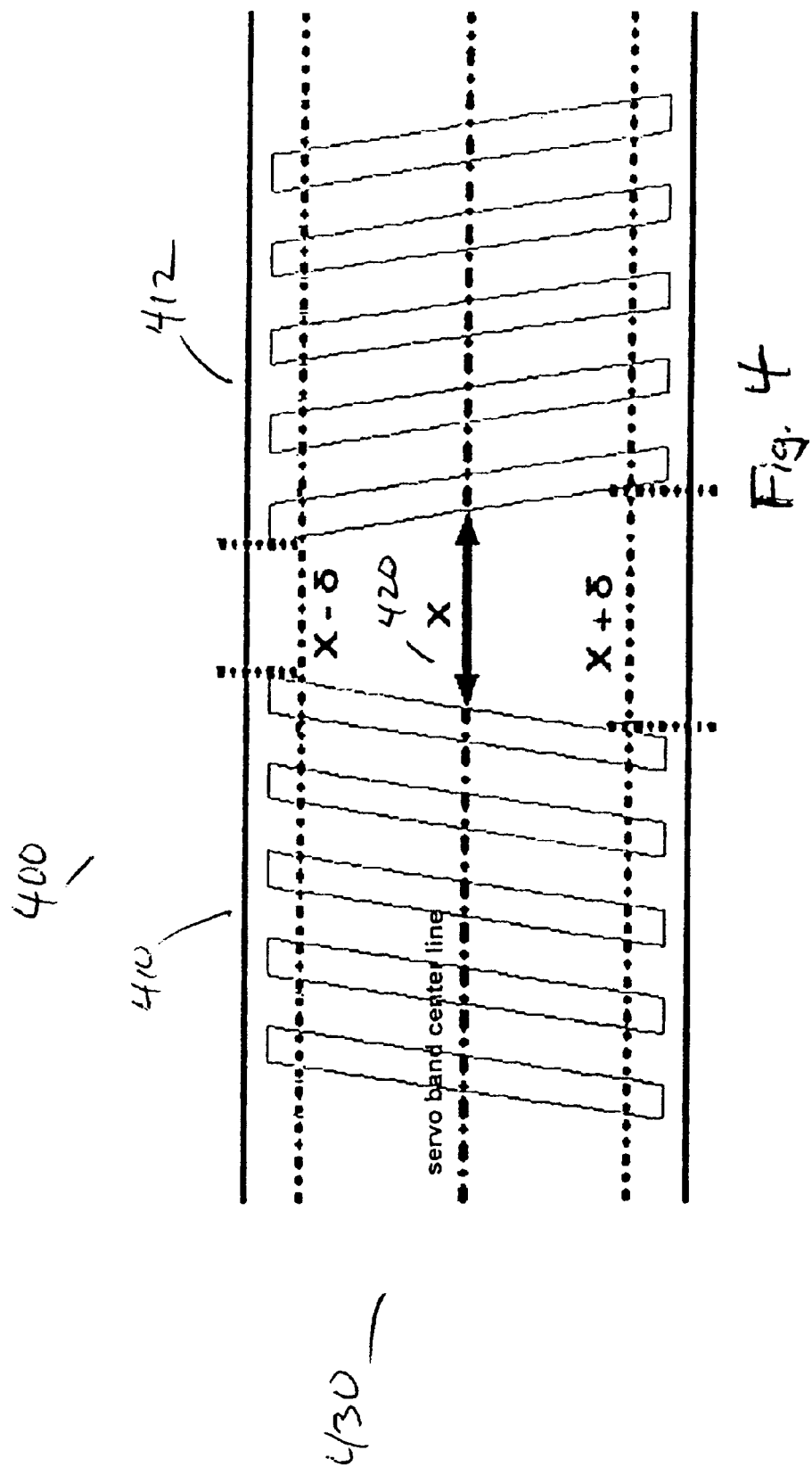
FIG. 4 illustrates a pair of servo burst according to the present invention.

FIG. 4 illustrates a pair of servo burst 400 according to the present invention. The servo bursts pairs 410, 412 are at an angle to each other, and the servo heads move such that they keep a constant value 420 for the distance between the bursts. In this way the servo is able to follow a straight line within the servo band 430. Any small deviation away from the correct path causes a variation (plus or minus) in the gap between the bursts, e.g., x−δ or x+δ. Provided that the servo head element follows a straight line along the servo band, then the distance "x" 420 shown in FIG. 4 remains constant. Two servo bands are used simultaneously to provide two sources of servo information for increased accuracy.

In reality, the format specifies six nominal servo positions within each servo band, and, in addition, the servo head is made up of two servo head elements to address a single servo band. This means that, using the two elements, the servo head is able to reposition within the servo band 430 for the six forward and reverse data wraps within each data band. The distance between each servo position corresponds to the distance apart that the data tracks are written. This technology can be very finely tuned and is capable of supporting very high track densities using the same servo tracks because the currently used and defined six nominal positions are basically definitions of six different "x distances" 420 between servo bursts and not a fixed servo track. By defining additional "x distance" positions 420, it is possible to increase the number of tracks on a cartridge while still using the same cartridge and servo tracks.

Figure 5:
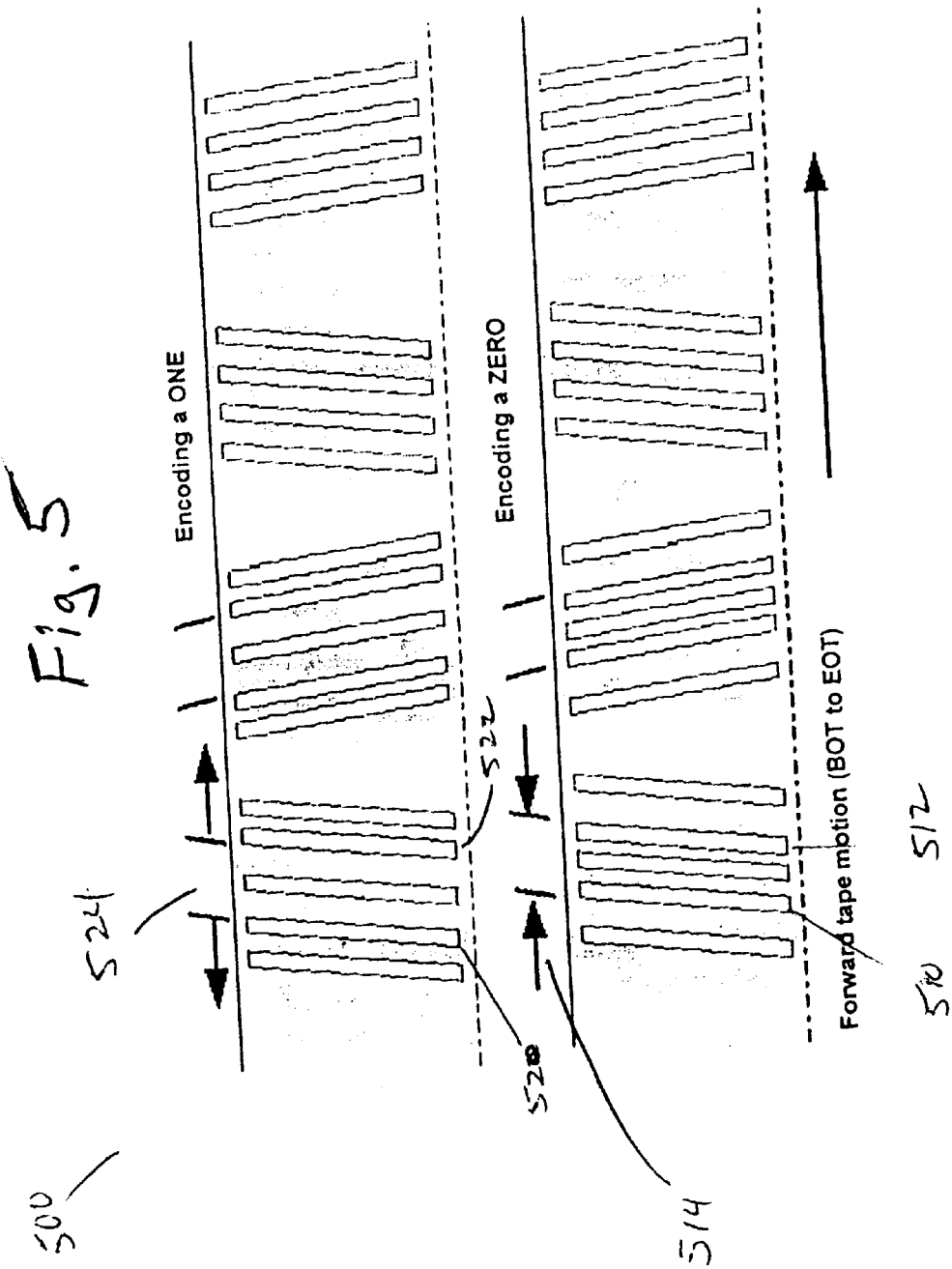
FIG. 5 illustrates the encoding of bits using the servo stripes within the servo bursts according to the present invention.

FIG. 5 illustrates the encoding of bits using the servo stripes within the servo bursts 500 according to the present invention. The servo band is designed not only for track following but also for recording the longitudinal position (LPOS). The absolute location down the length of the tape and the manufacturer data are recorded in LPOS "words", approximately every quarter of an inch (0.7cm) along the tape. The LPOS word consists of symbols constructed from bit sequences (ones and zeros); these bits are encoded within the servo frames.

Each servo frame encodes one bit using the first pair of servo bursts. When servo stripes 2 510 and 3 512 (out of the five) are shifted inwards 514, this encodes a zero; when servo stripes 2 520 and 3 522 are shifted outwards 524, this encodes a one. The LPOS word contains 36 bits and thus has a length of 36 servo frames. Each of the 5 servo bands on the tape may be uniquely identified by the relative positions of the frames down the tape, in adjacent servo bands. The offset of the frames between servo band 'n' and servo band 'n+1' are specific to each servo band (0 and 1, 1 and 2, 2 and 3, or 3 and 4). Thus the drive can move the head directly from the physical beginning of the tape to a specific logical position for reading or writing.

Figure 6:
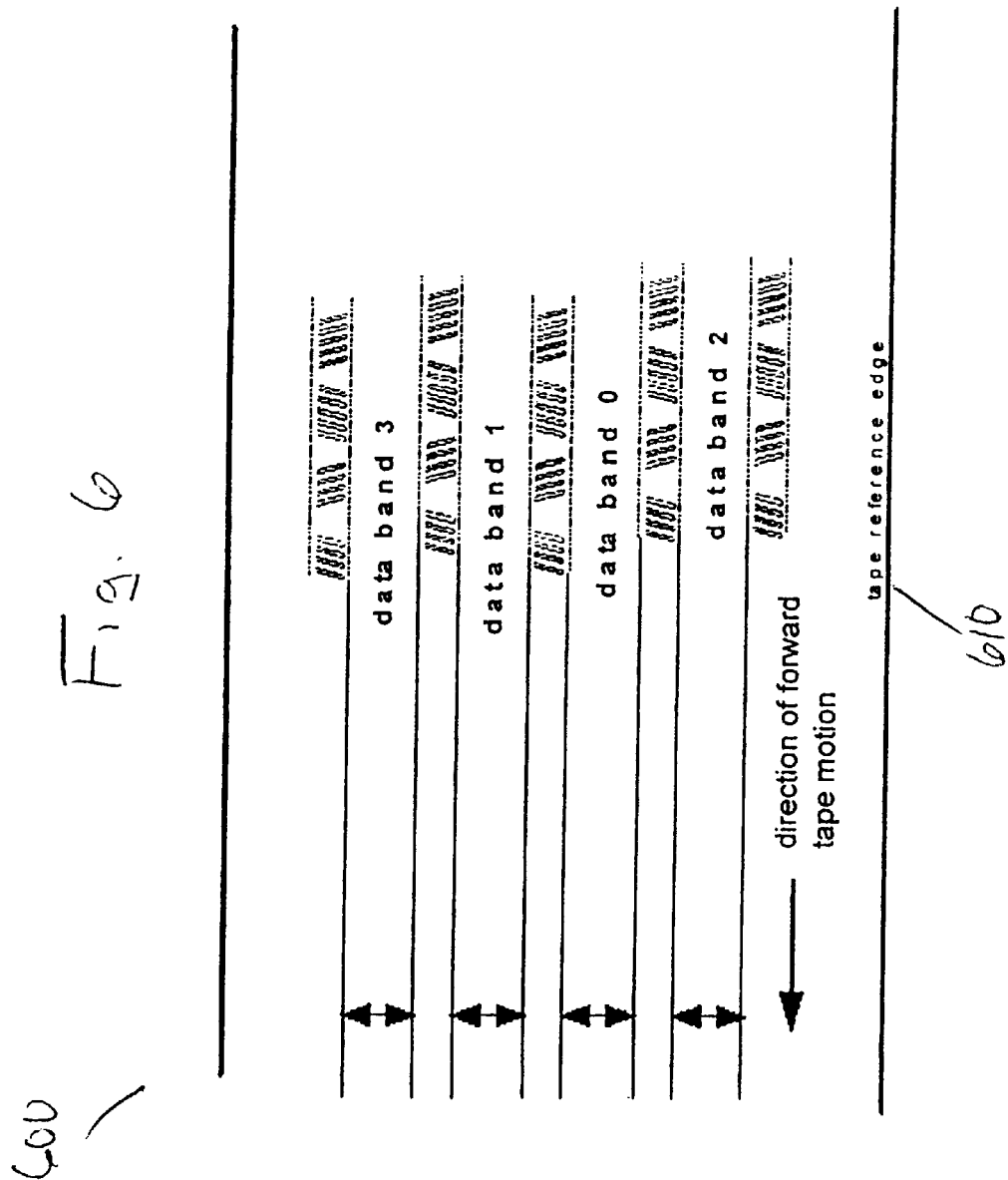
FIG. 6 illustrates the area between adjacent servo bands that is defined as the data bands according to the present invention.

FIG. 6 illustrates the area between adjacent servo bands that is defined as the data bands 600. There are 4 data bands numbered 2, 0, 1, and 3, where data band number 2 is nearest the reference edge 610 of the tape and data band 3 is furthest away. The data bands are written in sequence beginning with 0 (in the center of the tape) and ending with 3.

Each data band consists of 96 tracks which are recorded 8 tracks at a time from one end of the tape to the other in the following way:

The head is positioned over data band 0, and the first set of 8 tracks are written from the physical beginning of the tape to the physical end.

The head physically repositions (using a different servo position within the same servo bands) and switches electronically to a second set of 8 write elements in order to write 8 tracks in the reverse direction back to the physical beginning of the tape.

The head physically repositions again, and, switching back to the first set of write elements, writes another set of 8 tracks to the physical end of the tape.

The head continues to switch and index in this manner until all 96 tracks are written and the head is back at the physical beginning of the tape.

The head moves to data band 1 to continue writing the data.

A group of tracks recorded concurrently in the physical forward or the physical backward direction is called a wrap. Wraps recorded while the tape is moving from BOT to EOT are forward wraps; wraps recorded while the tape is moving from EOT to BOT are reverse wraps. The wraps are recorded in a serpentine fashion, as described—a forward wrap, then a reverse wrap. They are numbered sequentially in the order that they are processed, starting with wrap 0. Thus there are 6 forward wraps making up a data band and 6 reverse wraps. The individual tracks within a wrap are interleaved with tracks from other wraps; in other words, adjacent tracks are not part of the same wrap.

Figure 7:
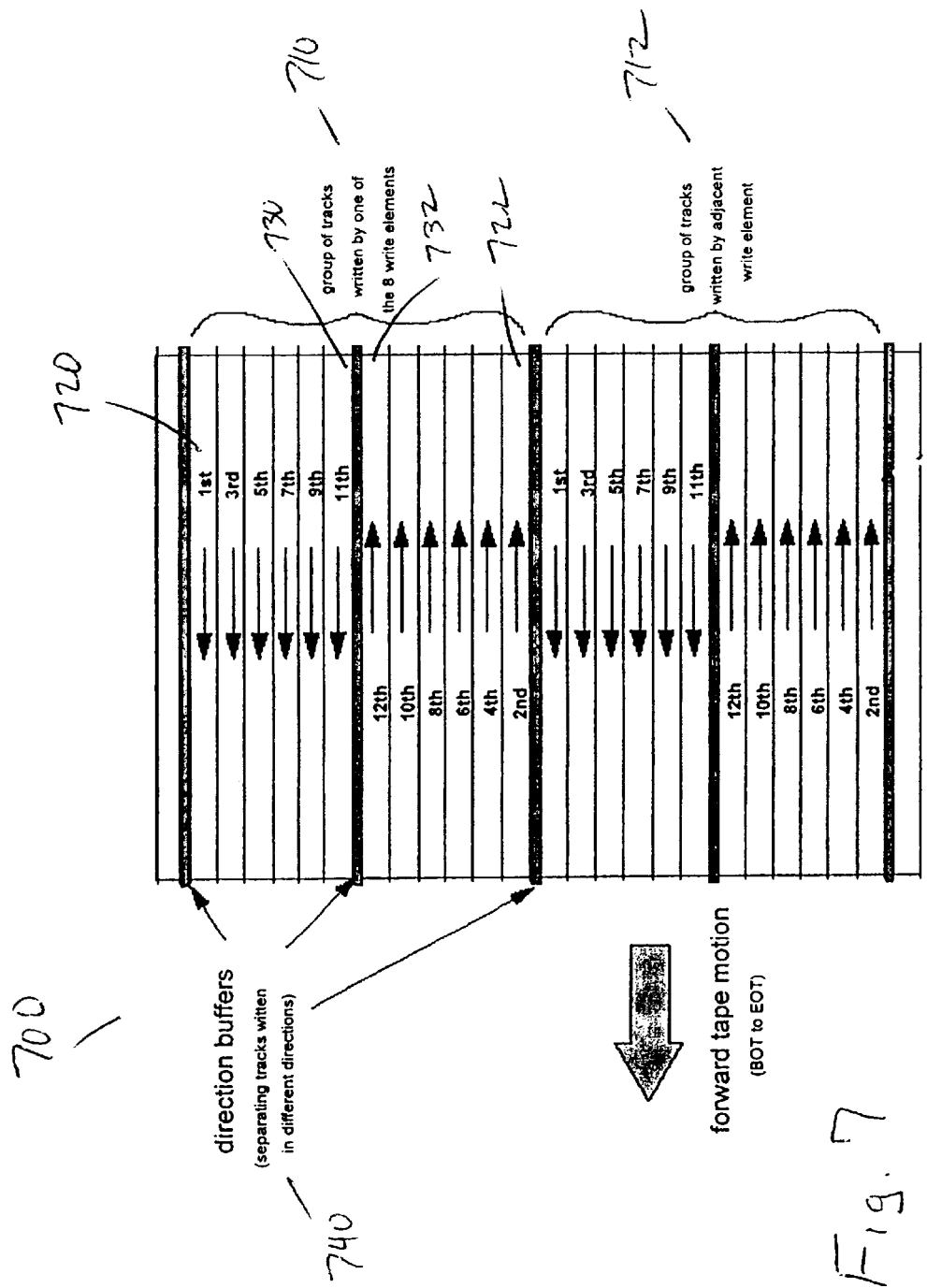
FIG. 7 is a magnified view of the data band illustrated in FIG. 6 showing the sequence of a data band in which the tracks are written.

FIG. 7 expands on FIG. 6 to illustrate the sequence of a data band 700 in which the tracks are written. One data band 700 is magnified to show a first area 710 written by a first of one of the 8 write elements and a second area 712 written by an adjacent write element. This is one quarter of the width of the data band. You can see that the tracks are written in an inward spiral (serpentine) manner; the 1st 720 and 2nd 722 tracks are furthest away from one another while the 11th 730 and 12th 732 tracks are adjacent to one another. The space between tracks written in opposing directions is called a direction buffer 740. This space is designed to minimize magnetic interference between tracks written in opposite directions (cross-track interference).

Read/verify elements are built into the tape head in the drive. The data is written by the write elements and then immediately passes the read/verify elements and is checked for errors. If any errors are found the block of data is rewritten further down the tape. The total number of data tracks across the width of the tape is 384, and they are numbered 0 through 383. The track numbering is not relating to the sequence in which the tracks are written, data track 383 being the data track closest to the reference edge of the tape, and data track 0 being furthest away.

Figure 8:
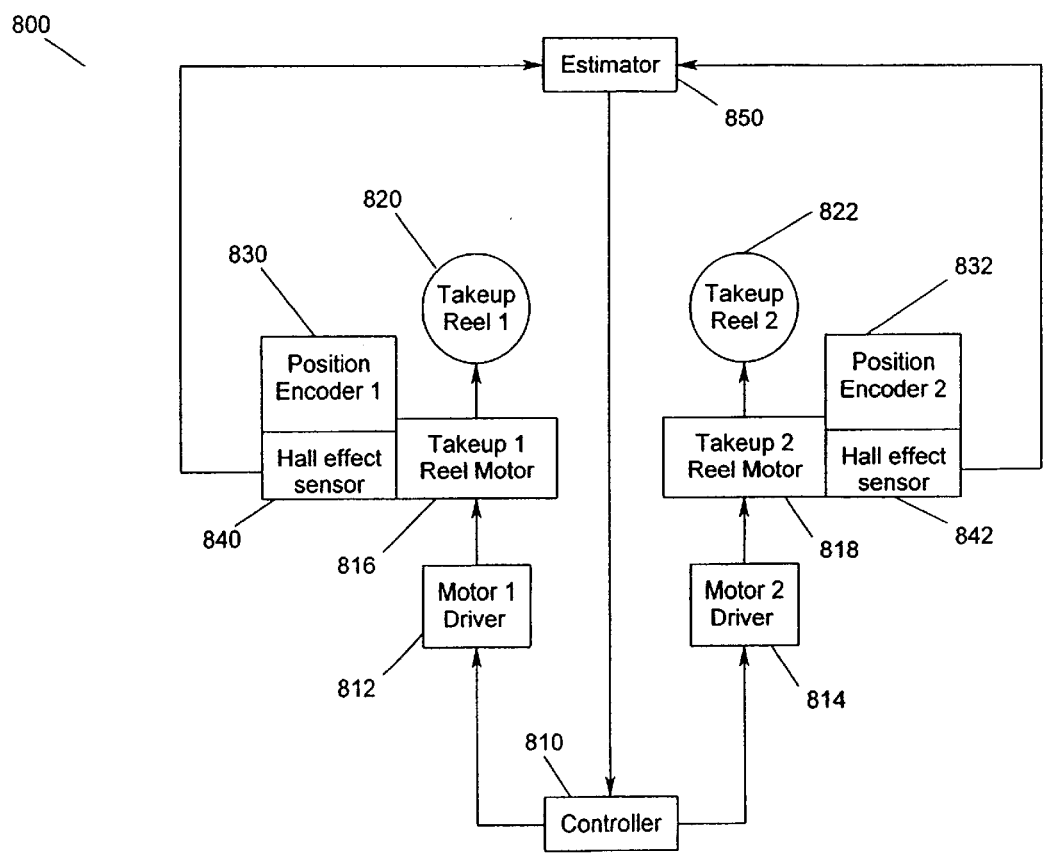
FIG. 8 illustrates a block diagram of the closed-loop LPOS estimation circuit according to the present invention.

FIG. 8 illustrates a block diagram of the closed-loop LPOS estimation circuit 800 according to the present invention. In FIG. 8, a controller 810 provides control signals to motor driver 1 812 and motor driver 2 814. Motor driver 1 812 and motor driver 2 814, in turn, provide drive signals to takeup reel motor 1 816 and takeup reel motor 2 818. The takeup reel motor 1 816 and takeup reel motor 2 818 control the position of tape takeup reel 1 820 and takeup reel 2 822. Position encoder 1 830 and position encoder 832 include Hall effect sensors 840, 842, respectively, for commutating the brushless DC motors 816, 818. The resolution of the hall sensors 840, 842 is fairly low, e.g., 24 hall states per revolution of the motor is typical. This is, however, sufficient resolution for the conditions to start, stop or backhitch the tape motion. The hall count resolution of linear tape position varies with tape reel radius and is accounted for in the estimator 850. The estimator 850 produces LPOS information that has long-distance accuracy to cause controller 810 to move the tape over the whole length of tape, to rewind from the end of tape to the beginning of tape and unspool, unthread and eject a cartridge should LPOS be permanently lost from the servo signals.

Figure 9:
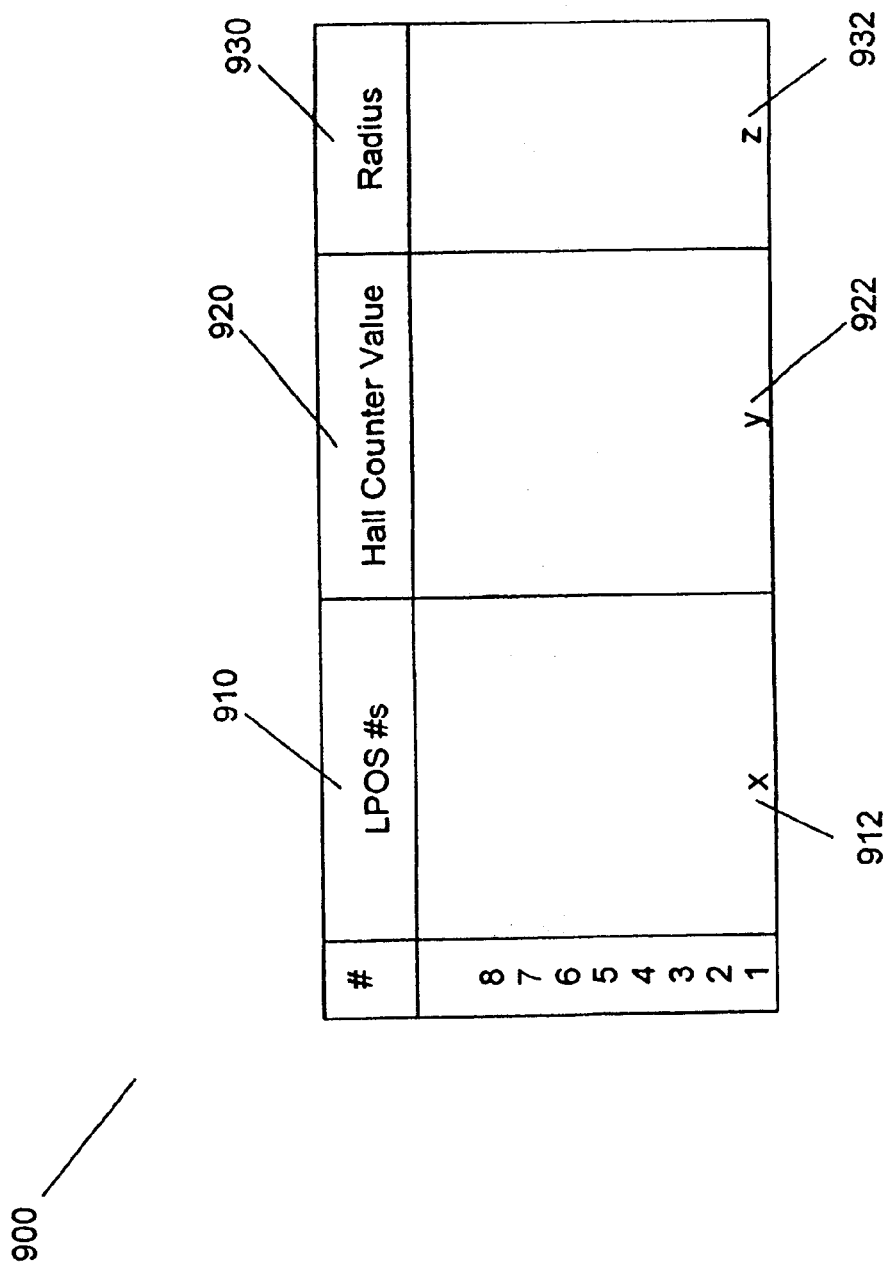
FIG. 9 illustrates a table for estimating LPOS according to the present invention.

FIG. 9 illustrates a table 900 for estimating LPOS according to the present invention. While valid LPOS is being detected from the servo track, a media position trace is stored into a table. In FIG. 9, the table 900 includes fields for entry of the last eight valid LPOS numbers detected from tape 910, with the corresponding Hall counter values 920 and corresponding radius valves 930. Every time a new LPOS number 912 is detected, it is stored into the table 900 along with the current Hall counter value 922 and current reel radius 932. Successive LPOS numbers 910 usually differ by a value of 1. The successive values may not differ by the value of 1 if an invalid LPOS is entered into the table 900, or if there is a break in the detected LPOS data. The table 900 of the media position trace is used to initialize the LPOS estimator when detected LPOS becomes invalid.

Figure 10:
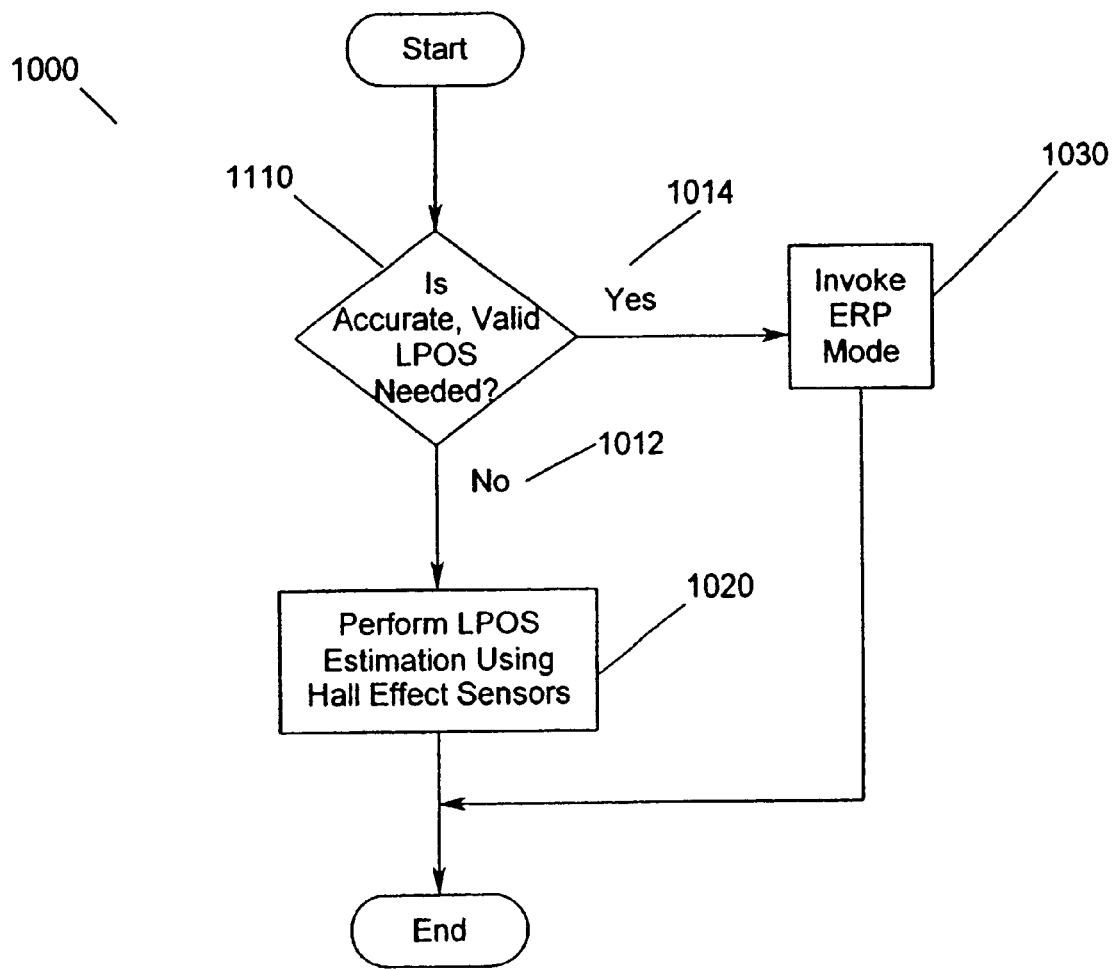
FIG. 10 illustrates a flow chart of the method for providing linear position (LPOS) estimations according to the present invention.

FIG. 10 illustrates a flow chart 1000 of the method for providing linear position (LPOS) estimations according to the present invention. First, a determination is made whether accurate, valid LPOS data is needed 1010. If no 1012, then LPOS estimation is performed using the Hall effect sensors 1020 (Method 1). If yes 1014, then an error recovery procedure (ERP) is invoked 1030 to provide accurate LPOS information which is synchronized to a validly detected LPOS from tape within about 1 meter prior to the desired data record (Method 2).

Figure 11:
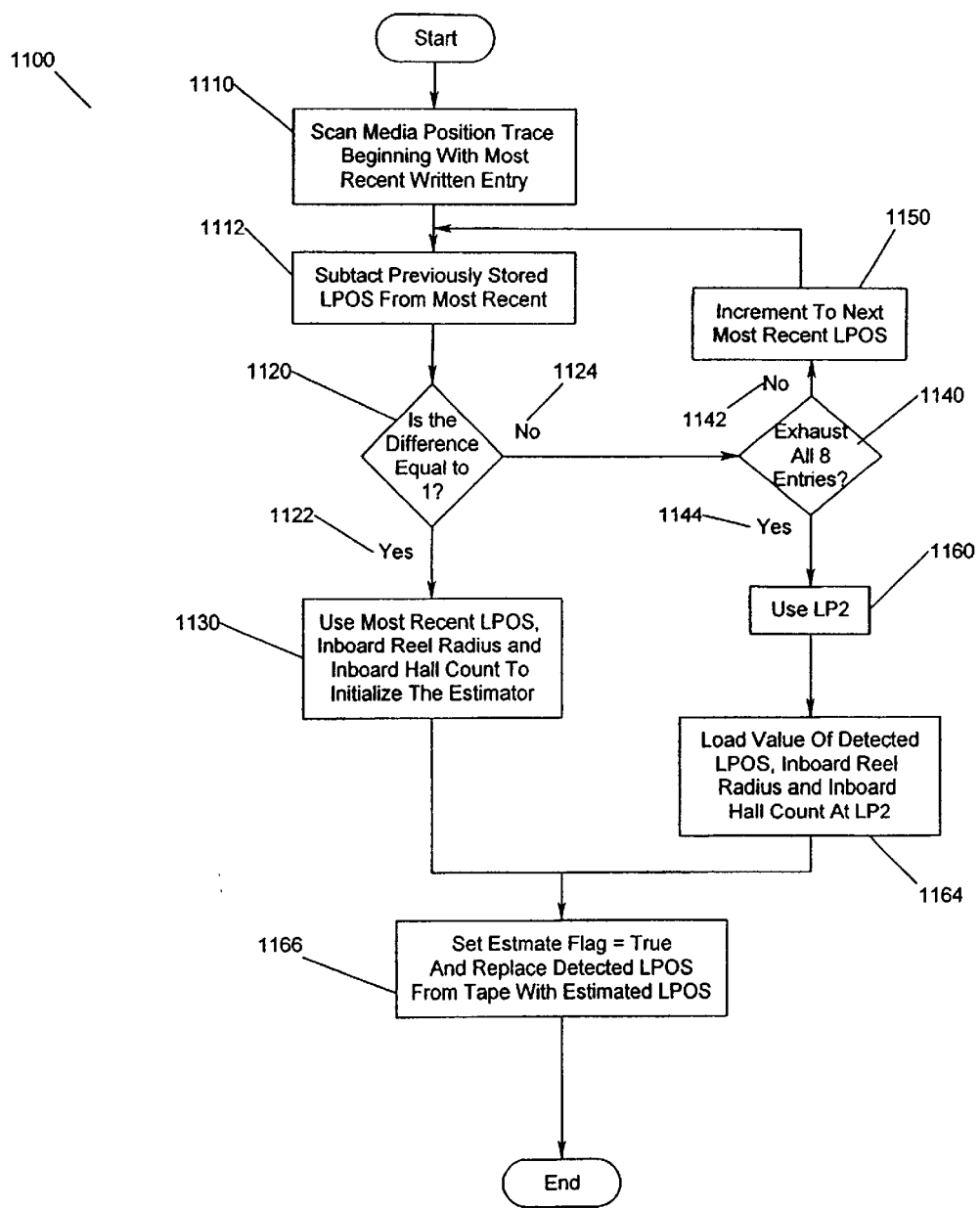
FIG. 11 illustrates a flow chart of LPOS estimation performed using the Hall effect sensors according to the present invention.

FIG. 11 illustrates a flow chart 1100 of LPOS estimator initialization performed using the Hall effect sensors and reel radius according to the present invention. When detected LPOS becomes invalid, the initial conditions of the estimator must be set. The media position trace is scanned beginning with the most recent written entry into it 1110. The previous stored LPOS number is subtracted from the most recent LPOS value 1112. A determination is made whether the difference between the previous stored LPOS number and the most recent LPOS value is equal to 1 1120. If the difference is equal to 1 1122, then the most recent table entry is used to initialize the estimator 1130. If the difference is not equal to 1 1124, a determination is made whether all eight entries of the media position trace table are exhausted 1140. If all eight entries are not exhausted 1142, then the table is examined in the same manner for the values of stored LPOS that are one entry older in the table 1150. This process is continued until a difference between successive LPOS entries of 1 are found which validates a table entry to initialize the estimator. If all eight entries are exhausted without finding a valid entry with which to initialize the LPOS estimator 1144, then the value for LPOS and Hall counter at LP2 are used 1160. For every successful tape load operation, the media position is established at LP2 by correlating detected LPOS from tape to the Hall counter at LP2. This always provides an initial value for the estimator, however the tape length that this estimate must span can be great, and it is not a preferred initial condition for the estimator.

The estimator has three initialization values as follows:
lpos.start_val=SCDA.MP trace[j].lpos_value;
lpos.start_cnt=SCDA.MP trace[j].hall_count;

lpos.start_rad=InbRadius.Used;

where:
- lpos.start_val=first valid LPOS value from the media position trace,
- lpos.start_cnt=corresponding inboard Hall counter value to LPOS used,
- lpos.start_rad=value of the inboard reel radius corresponding to the first valid LPOS.

If the media position trace has no valid values to initialize the estimator, the lpos.start_val is loaded with the detected LPOS at LP2, the lpos.start_cnt is loaded with the inboard Hall count at LP2, and lpos.start_rad is loaded with the value of the inboard reel radius at LP2 to correspond with the other initial conditions of the estimator 1164. When the detected LPOS from tape is invalid, and the estimator is initialized, an estimate flag is set TRUE to enable the estimate computations, and to replace the detected LPOS from tape with the estimated LPOS 1166, i.e., lpos.est_flag=TRUE.

The algorithm to estimate LPOS from the Hall counter is given by the equations:

lpos.est_radius=(291*(InbRadius.Used+lpos.start_rad))>>8;

lpos.est_count=inb_hall_counter−lpos.start_cnt;

lpos.estimate=lpos.start_val+(((SINT32)(lpos.est_radius*lpos.est count))>>12);

These equations in the fixed-point arithmatic format of the microprocessor implement the following equation:

LPOS.estimate=LPOS(0)+(pi/N.hall)*[Rad+Rad(0)]*[HallCount−HallCount(0)], where,
- LPOS.estimate=estimated LPOS,
- LPOS(0)=initial condition for LPOS,
- Rad=radius of inboard reel,
- Rad(0)=initial condition for inboard reel radius,
- HallCount=inboard motor hall counter value,
- HallCount(0)=initial condition for the inboard hall counter,
- pi=physical constant, (3.14159...)
- N.hall=resolution of the hall sensors (24).

Figure 12:
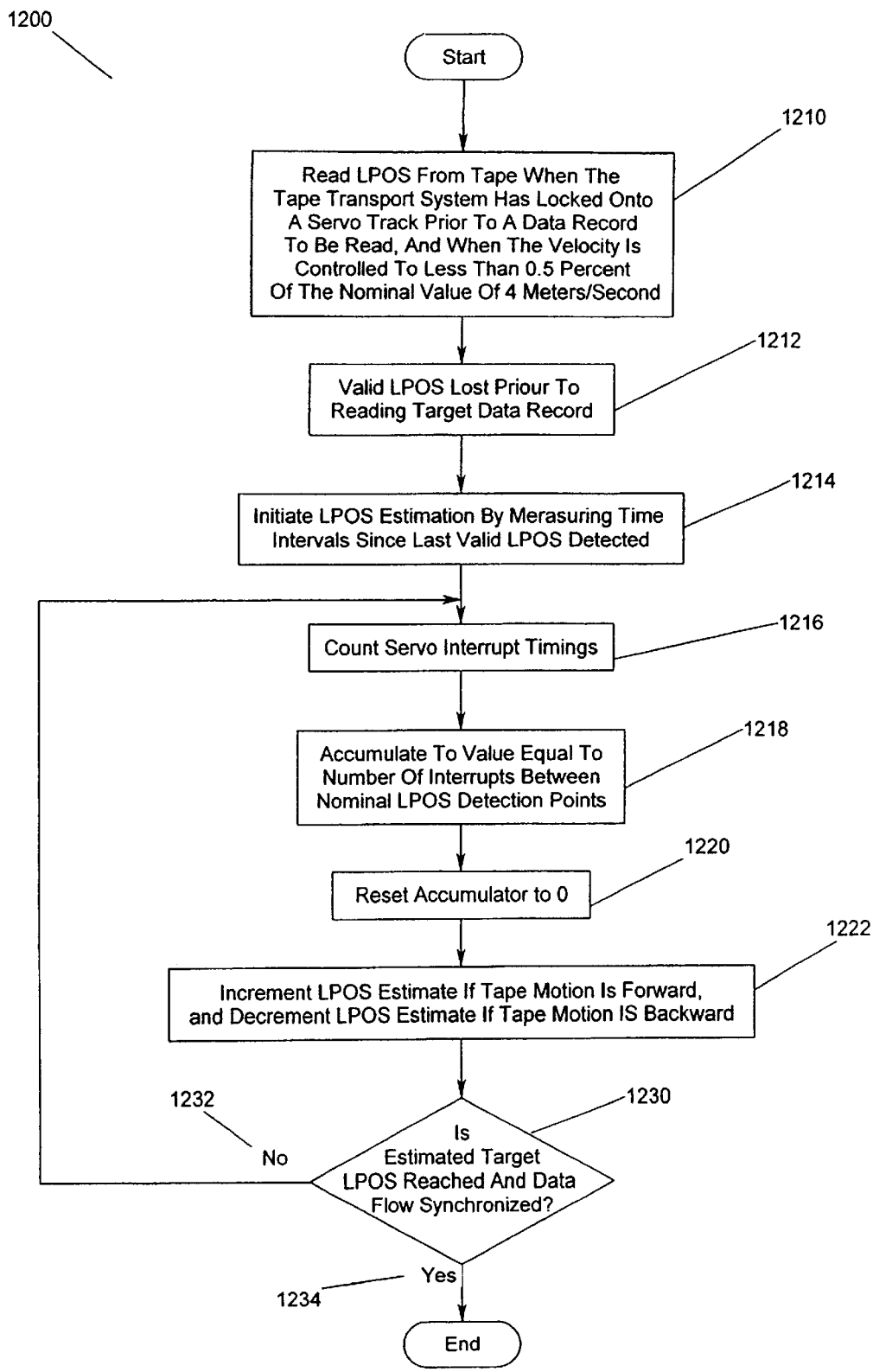
FIG. 12 is a flow chart for providing accurate LPOS information when valid LPOS data is not detected from the tape.

FIG. 12 is a flow chart 1200 for providing accurate LPOS information when valid LPOS data is not detected from the tape. The method illustrated in FIG. 12 is used for estimating LPOS to avoid the condition where a permanent read error may occur due to mis-detected LPOS at the beginning of the first data record to be read after a tape stopped condition, repositioning condition, or a band change. Normally LPOS must be detected from tape to satisfy the requirements for synchronizing the data flow to media position. However when valid LPOS can not be detected, a Read ERP mode is invoked, and the second method of estimating LPOS is used. This method provides very accurate LPOS information which is synchronized to a validly detected LPOS from tape within about 1 meter prior to the desired data record. This provides a much more accurate LPOS estimate for synchronizing the data flow than is available from the first method of estimating LPOS.

In FIG. 12, LPOS is read from tape when the tape transport system has locked onto a servo track prior to a data record to be read, and when the velocity error is controlled to less than 0.5 percent of the nominal value of 4 meters/second 1210. When valid LPOS is lost prior to reaching the target data record 1212, the estimator begins estimating LPOS by measuring time intervals since the last valid LPOS detected 1214. The servo interrupt timings are counted 1216 and accumulated to a value equal to the number of interrupts between nominal LPOS detection points 1218. When this value has been reached, the accumulator is reset to zero 1220, and the LPOS estimate is incremented if tape motion is forward, and decremented if tape motion is backward 1222. A determination is made whether the estimated target LPOS is reached, and the data flow synchronized 1230. If not 1232, the servo interrupt timings are again counted and the process repeated until the estimated target LPOS is reached, and the data flow synchronized 1234. In this way, a permanent read error due to invalid LPOS is avoided.

Figure 13:
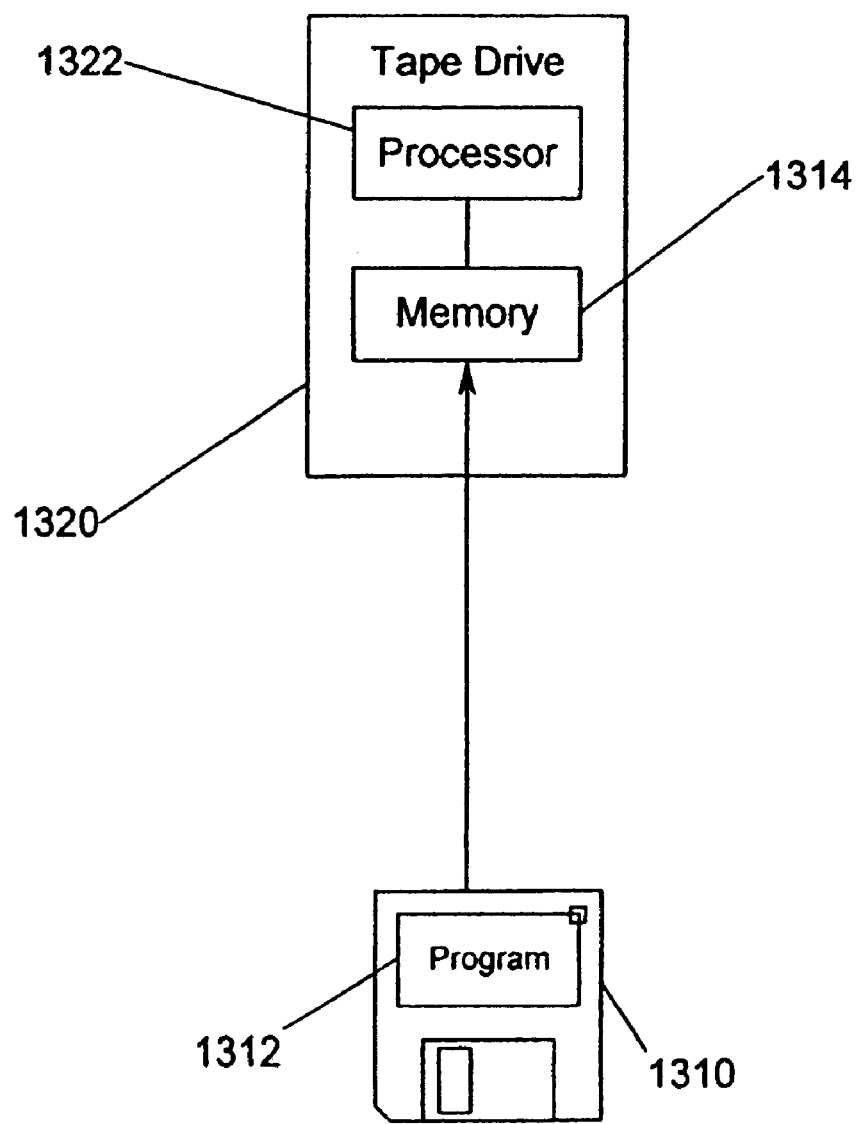
FIG. 13 is a block diagram that illustrates an exemplary hardware environment for providing linear position (LPOS) estimations according to the present invention.

The process illustrated with reference to FIG. 10–12 may be tangibly embodied in a computer-readable medium or carrier, e.g. one or more of the fixed and/or removable data storage devices 1310 illustrated in FIG. 13, or other data storage or data communications devices. A computer program 1312 on the storage device 1310 may be loaded into the memory 1314 or into the storage device 1310 to configure the tape drive 110 or tape library 100, as illustrated in FIG. 1, for execution. The computer program 1312 comprise instructions which, when read and executed by a processor 1322 of the tape drive 110 or tape library 100, as illustrated in FIG. 1, causes the tape drive 110 or tape library 100, as illustrated in FIG. 1, to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing linear position (LPOS) estimations, comprising:
    a) determining whether detection of accurate and valid linear position data from a magnetic recording tape is needed;
    b) performing linear position estimation using the Hall effect sensors when linear position data from a magnetic recording tape is not needed; and
    c) invoking an error recovery procedure to provide accurate and valid linear position information from tape when linear position data from a magnetic recording tape is needed.

2. The method of claim 1 wherein the accurate linear position information is synchronized to a validly detected linear position data from tape.

3. The method of claim 1 wherein the accurate linear position information which is synchronized to a validly detected linear position data from tape within about one meter prior to the desired data record.

4. The method of claim 1 wherein performing linear position estimation using the Hall effect sensors further comprises:
    i) scanning a media position trace in a media position trace table beginning with the most recently written linear position;
    ii) subtracting a previous stored linear position from a most recent linear position;
    iii) determining whether the difference between the previous stored linear position and the most recent linear position is equal to 1;
    iv) using the most recent table entry to initialize the estimator when the difference is equal to 1;

v) determining whether all eight entries of the media position trace table are exhausted when the difference is not equal to 1;

vi) incrementing to a next most recent linear position when all eight entries are not exhausted and repeating ii–iii;

vii) repeating ii–vi until a difference between successive linear position entries of 1 are found or all eight entries are exhausted;

viii) using the value for linear position and Hall counter at the next most recent linear position when all eight entries are exhausted without finding a valid entry with which to initialize the linear position estimator;

ix) loading value of inboard reel radius at the next most recent linear position; and x) setting an estimate flag is set TRUE to enable the estimate computations and to replace the detected linear position from tape with the estimated linear position when the detected linear position from tape is invalid and the estimator is initialized.

5. The method of claim 1 wherein an algorithm to estimate linear position from the Hall counter is given by the equations:

linear position.estimate = linear position(0) +

$$(pi/N_{hall}) * [Rad + Rad(0)] * [HallCount - HallCount(0)],$$

where, linear position.estimate is the estimated linear position, linear position(0) is the initial condition for linear position, Rad is the radius of the inboard reel, Rad(0) represents the initial condition for inboard reel radius, HallCount represents the inboard motor hall counter value, HallCount(0) represents the initial condition for the inboard hall counter, pi is a physical constant, and $N_{hall}$ represents the resolution of the hall sensors.

6. The method of claim 1 wherein invoking an error recovery procedure further comprises:

reading linear position from tape when a tape transport system has locked onto a servo track prior to a data record to be read and when the velocity is controlled to a predetermined velocity;

begin estimating linear position by measuring time intervals since the last valid linear position detected when valid linear position is lost prior to reaching the target data record;

counting the servo interrupt timings;

accumulating to a value equal to the number of interrupts between nominal linear position detection points;

resetting the accumulator to zero when this value has been reached;

incrementing the linear position estimate if tape motion is forward, and decrementing the linear position estimate if tape motion is backward;

determining whether the estimated target linear position is reached, and the data flow synchronized; and when the estimated target linear position is not reached, or the data flow is not synchronized, counting the servo interrupt timings again until the estimated target linear position is reached or the data flow is synchronized.

7. The method of claim 6 wherein the predetermined velocity is less than 0.5 percent of the nominal value of 4 meters/second.

8. A method for performing linear position estimation using the Hall effect sensors, comprising:

a) scanning a media position trace in a media position trace table beginning with the most recently written linear position;

b) subtracting a previous stored linear position from a most recent linear position;

c) determining whether the difference between the previous stored linear position and the most recent linear position is equal to 1:

d) using the most recent table entry to initialize the estimator when the difference is equal to 1;

e) determining whether all eight entries of the media position trace table are exhausted when the difference is not equal to 1;

f) incrementing to a next most recent linear position when all eight entries are not exhausted and repeating b–c;

g) repeating b–f until a difference between successive linear position entries of 1 are found or all eight entries are exhausted;

h) using the value for linear position and Hall counter at the next most recent linear position when all eight entries are exhausted without finding a valid entry with which to initialize the linear position estimator;

i) loading value of inboard reel radius at the next most recent linear position; and setting an estimate flag is set TRUE to enable the estimate computations and to replace the detected linear position from tape with the estimated linear position when the detected linear position from tape is invalid and the estimator is initialized.

9. The method of claim 8 wherein an algorithm to estimate linear position from the Hall counter is given by the equations:

linear position.estimate = linear position(0) +

$$(pi/N_{hall}) * [Rad + Rad(0)] * [HallCount - HallCount(0)],$$

where, linear position.estimate is the estimated linear position, linear position(0) is the initial condition for linear position, Rad is the radius of the inboard reel, Rad(0) represents the initial condition for inboard reel radius, HallCount represents the inboard motor hall counter value, HallCount(0) is the initial condition for the inboard hall counter, pi is a physical constant, and $N_{hall}$ represents the resolution of the hall sensors.

10. A method for providing accurate, valid linear position data from a magnetic tape in a LTO tape drive; comprising;

reading linear position from tape when a tape transport system has locked onto a servo track prior to a data record to be read and when the velocity is controlled to a predetermined velocity;

begin estimating linear position by measuring time intervals since the last valid linear position detected when valid linear position is lost prior to reaching the target data record;

counting the servo interrupt timings;

accumulating to a value equal to the number of interrupts between nominal linear position detection points;

resetting the accumulator to zero when this value has been reached;

incrementing the linear position estimate if tape motion is forward, and decrementing the linear position estimate if tape motion is backward;

determining whether the estimated target linear position is reached, and the data flow synchronized; and when the estimated target linear position is not reached, or the data flow is not synchronized, counting the servo interrupt timings again until the estimated target linear position is reached or the data flow is synchronized.

11. The method of claim 10 wherein the predetermined velocity is less than 0.5 percent of the nominal value of 4 meters/second.

12. A memory configured with a media trace table for use in performing linear position estimation using the Hall effect sensors, wherein the media trace table comprises:

a first field for recording linear position indicators; and a second field for recording Hall counter values, the Hall counter values being associated with a linear position indicator in the first field.

13. The memory of claim 12 wherein the number of linear position indicators and Hall counter values is eight.

14. A tape drive, comprising:

magnetic recording tape having servo signals and data recording thereon;

tape takeup reels for spooling the magnetic recording tape thereon;

a head for reading signals on the magnetic tape;

reel motors, coupled to the tape takeup reels, for driving the tape takeup reels to move the tape relative to the head;

Hall effect sensors, coupled to the reel motors, for sensing revolution of the tape takeup reels, the Hall effect sensors providing a Hall count resolution that varies with tape reel radius;

a controller for driving the reel motors; and an estimator, coupled to the Hall effect sensors, for using the Hall count resolution to produce linear position information;

wherein the estimator scans a media position trace in a media position trace table beginning with the most recently written linear position, subtracts a previous stored linear position from a most recent linear position, determines whether the difference between the previous stored linear position and the most recent linear position is equal to 1, uses the most recent table entry to initialize the estimator when the difference is equal to 1, ascertains whether all eight entries of the media position trace table are exhausted when the difference is not equal to 1, increments to a next most recent linear position when all eight entries are not exhausted and repeating the subtracting and determining, repeating the subtracting, determining, using and ascertaining until a difference between successive linear position entries of 1 are found or all eight entries are exhausted, uses the value for linear position and Hall counter at the next most recent linear position when all eight entries are exhausted without finding a valid entry with which to initialize the linear position estimator, loads a value of inboard reel radius at the next most recent linear position and sets an estimate flag is set TRUE to enable the estimate computations and to replace the detected linear position from tape with the estimated linear position when the detected linear position from tape is invalid and the estimator is initialized.

15. A tape drive, comprising:

magnetic recording tape having servo signals and data recording thereon;

tape takeup reels for spooling the magnetic recording tape thereon;

a head for reading signals on the magnetic tape;

reel motors, coupled to the tape takeup reels, for driving the tape takeup reels to move the tape relative to the head;

Hall effect sensors, coupled to the reel motors, for sensing revolution of the tape takeup reels, the Hall effect sensors providing a Hall count resolution that varies with tape reel radius;

a controller for driving the reel motors and processing signals from the head, and an estimator, coupled to the Hall effect sensors, for using the Hall count resolution to produce linear position information;

wherein the estimator reads linear position from the tape when a tape transport system has locked onto a servo track prior to a data record to be read and when the velocity is controlled to a predetermined velocity, begins estimating linear position by measuring time intervals since the last valid linear position detected when valid linear position is lost prior to reaching the target data record, counts the servo interrupt timings, accumulates to a value equal to the number of interrupts between nominal linear position detection points, resets the accumulator to zero when this value has been reached, increments the linear position estimate if tape motion is forward, and decrementing the linear position estimate if tape motion is backward, determines whether the estimated target linear position is reached, and the data flow synchronized and when the estimated target linear position is not reached, or the data flow is not synchronized, counting the servo interrupt timings again until the estimated target linear position is reached or the data flow is synchronized.

16. An article of manufacture comprising a program storage medium readable by a computer, the medium tangibly embodying one or more programs of instructions executable by the computer to perform a method for providing linear position (LPOS) estimations, the method comprising:

a) determining whether detection of accurate and valid linear position data from a magnetic recording tape is needed;

b) performing linear position estimation using the Hall effect sensors when linear position data from a magnetic recording tape is not needed; and c) invoking an error recovery procedure to provide accurate and valid linear position information from tape when linear position data from a magnetic recording tape is needed.

17. The article of manufacture of claim 16 wherein the accurate linear position information is synchronized to a validly detected linear position data from tape.

18. The article of manufacture of claim 16 wherein the accurate linear position information which is synchronized to a validly detected linear position data from tape within about one meter prior to the desired data record.

19. The article of manufacture of claim 16 wherein performing linear position estimation using the Hall effect sensors further comprises:

i) scanning a media position trace in a media position trace table beginning with the most recently written linear position;

ii) subtracting a previous stored linear position from a most recent linear position;

iii) determining whether the difference between the previous stored linear position and the most recent linear position is equal to 1;

iv) using the most recent table entry to initialize the estimator when the difference is equal to 1;

v) determining whether all eight entries of the media position trace table are exhausted when the difference is not equal to 1;

vi) incrementing to a next most recent linear position when all eight entries are not exhausted and repeating ii–iii;

vii) repeating ii–vi until a difference between successive linear position entries of 1 are found or all eight entries are exhausted;

viii) using the value for linear position and Hall counter at the next most recent linear position when all eight entries are exhausted without finding a valid entry with which to initialize the linear position estimator;

ix) loading value of inboard reel radius at the next most recent linear position; and x) setting an estimate flag is set TRUE to enable the estimate computations and to replace the detected linear position from tape with the estimated linear position when the detected linear position from tape is invalid and the estimator is initialized.

20. The article of manufacture of claim 16 wherein an algorithm to estimate linear position from the Hall counter is given by the equations:

$$\text{linear position.estimate} = \text{linear position}(0) +$$
$$(pi/N_{hall}) * [Rad + Rad(0)] * [HallCount - HallCount(0)],$$

where, linear position.estimate is the estimated linear position, linear position(0) is the initial condition for linear position, Rad is the radius of the inboard reel, Rad(0) represents the initial condition for inboard reel radius, HallCount represents the inboard motor hall counter value, HallCount(0) represents the initial condition for the inboard hall counter, pi is a physical constant, and $N_{hall}$ represents the resolution of the hall sensors.

21. The article of manufacture of claim 16 wherein invoking an error recovery procedure further comprises:

reading linear position from tape when a tape transport system has locked onto a servo track prior to a data record to be read and when the velocity is controlled to a predetermined velocity;

begin estimating linear position by measuring time intervals since the last valid linear position detected when valid linear position is lost prior to reaching the target data record;

counting the servo interrupt timings;

accumulating to a value equal to the number of interrupts between nominal linear position detection points;

resetting the accumulator to zero when this value has been reached;

incrementing the linear position estimate if tape motion is forward, and decrementing the linear position estimate if tape motion is backward;

determining whether the estimated target linear position is reached, and the data flow synchronized; and when the estimated target linear position is not reached, or the data flow is not synchronized, counting the servo interrupt timings again until the estimated target linear position is reached or the data flow is synchronized.

22. The article of manufacture of claim 21 wherein the predetermined velocity is less than 0.5 percent of the nominal value of 4 meters/second.

* * * * *

UNITED STATES PATENT AND TRADEMARK OFFICE
CERTIFICATE OF CORRECTION

PATENT NO.     : 6,791,781 B2
DATED          : September 14, 2004
INVENTOR(S)    : Bui et al.

It is certified that error appears in the above-identified patent and that said Letters Patent is hereby corrected as shown below:

Title page,
Item [56], References Cited, OTHER PUBLICATIONS, "Patent Abract of Japan (JP) 58189877), Recording System of Recorder, Hiroyoki et al, Nov. 5, 1983." should read -- Patent Abstract of Japan (JP) 58189877), Recording System of Recorder, Hiroyoki et al, Nov. 5, 1983. --

Column 5,
Line 15, "position ed if" should read -- positioned if --.

Column 6,
Line 26, "position ed" should read -- positioned --.

Signed and Sealed this

Eighth Day of March, 2005

JON W. DUDAS
*Director of the United States Patent and Trademark Office*